United States Patent [19]

Kraft et al.

[11] Patent Number: 5,016,043
[45] Date of Patent: May 14, 1991

[54] EXPOSURE CONTROL PROCESS AND PHOTOGRAPHIC COLOR COPYING APPARATUS

[75] Inventors: Walter Kraft, Zürich, Switzerland; Werner R. von Stein, Hamburg, Fed. Rep. of Germany

[73] Assignee: Gretag Systems, Bothell, Wash.

[21] Appl. No.: 411,120

[22] Filed: Sep. 22, 1989

[30] Foreign Application Priority Data

Sep. 23, 1988 [CH] Switzerland ............... 3541/88

[51] Int. Cl.$^5$ ............................................. G03B 27/80
[52] U.S. Cl. .................................... 355/38; 355/77
[58] Field of Search .................. 355/32, 35, 38, 77

[56] References Cited

U.S. PATENT DOCUMENTS

| | | |
|---|---|---|
| 3,369,449 | 2/1968 | Klauss et al. . |
| 3,542,471 | 11/1970 | Dubay . |
| 3,942,154 | 3/1976 | Akami et al. . |
| 4,092,067 | 5/1978 | Grossman . |
| 4,101,216 | 7/1978 | Grossman . |
| 4,101,217 | 7/1978 | Fergg et al. ............... 355/38 |
| 4,150,894 | 4/1979 | Meyer et al. . |
| 4,166,588 | 9/1979 | Krebbiel et al. . |
| 4,270,861 | 6/1981 | Beckman . |
| 4,279,505 | 7/1981 | Ursprung et al. . |
| 4,344,708 | 8/1982 | Tokuda . |
| 4,416,539 | 11/1983 | Terashita . |
| 4,422,752 | 12/1983 | Thurm et al. . |
| 4,566,786 | 1/1986 | Furisch et al. . |
| 4,589,766 | 5/1986 | Furisch et al. . |
| 4,610,537 | 9/1986 | Matsumoto . |
| 4,666,306 | 5/1987 | Matsumoto . |
| 4,668,082 | 5/1987 | Terashita et al. . |
| 4,676,628 | 6/1987 | Asbury, III . |
| 4,709,259 | 11/1987 | Suzuki . |
| 4,757,351 | 7/1988 | Birgmeir . |
| 4,779,987 | 10/1988 | Umemoto et al. . |
| 4,931,831 | 6/1990 | Knecht et al. . |
| 4,951,084 | 8/1990 | von Stein et al. . |

FOREIGN PATENT DOCUMENTS

| | | |
|---|---|---|
| 0103583 | 3/1988 | European Pat. Off. . |
| 1369864 | 10/1974 | United Kingdom . |

OTHER PUBLICATIONS

PCT Application No. WO 83/02869, Watt.
"The Reproduction of Color", p. 284, by R.W.G. Hunt.
Publication to van Trees entitled "Detection, Estimation, and Modulation Theory", Part I Detection, Estimation and Linear Modulation Theory, p. 232 of the 1987 CCD Data Book.

Primary Examiner—Monroe H. Hayes
Attorney, Agent, or Firm—Burns, Doane, Swecker & Mathis

[57] ABSTRACT

The copy originals are scanned photoelectrically by regions and three color densities are determined for each scanning regions. Additionally, using a high resolution scanning system, a detail contrast parameter describing the detail contrast in the scanning region is determined. The detail contrast parameters are evaluated together with the color densities of the scanning regions for the determination of the copy light quantities. In particular, in the correction of densities, scanning regions with higher detail contrasts are considered stronger than those with lower density contrasts, while color corrections are carried out in exactly the opposite manner.

20 Claims, 6 Drawing Sheets

EXPOSURE CONTROL PROCESS AND PHOTOGRAPHIC COLOR COPYING APPARATUS

BACKGROUND OF THE INVENTION

The invention concerns a process for the control of the exposure in a photographic color copying apparatus. More specifically, the present invention relates to a process and apparatus for the control of exposure in a photographic color copying apparatus, wherein a copy original is scanned in a plurality of scanning zones photoelectrically, a measured triplet value determined for each scanning zone from the scan values obtained, corresponding to the three color transmissions or color densities of the copy original, and from the triplet value, the necessary quantities of copying light determined with consideration of certain given criteria.

Since the introduction of the first photoprinter equipped with a color scanner enormous development has taken place in the direction of more highly integrated and less expensive structural elements. Above all, the development in the field of CCD sensors (CCD = Charge-Coupled Devices) has lead to sensors with a local resolution far above that which can be processed with a justifiable investment in computer time and computer capacity, and which are equal in price or even less costly than sensors with a resolution adapted to the task at hand (for example diode arrays). It is therefore conceivable for reasons of cost alone to use a high resolution (for example CCD) sensor as a scanner, the effective resolution of which is reduced to a measure by the summation (averaging) of the measured values of locally adjacent (relative to the measured original) measuring points, that would permit the processing of the data at a justifiable expense. In the production of color copies there are "classical" problems in which even the most recent processes of density and color correction based on a relatively high scanner resolution (approximately 1,000 measuring points per negative) fail entirely or partially.

Thus, for example, exposures with bright sky portions are often copied too dark. In U.S. Pat. No. 4,279,505 a process is described whereby image areas may be recognized with a certain degree of probability that they may be sky areas, in order to partially eliminate the problems; however, this process is capable of improvement. Another problem consists of distinguishing between flash exposures and a class of counter light exposures (street canyons, doorways, etc.). In both cases, the negative has a more or less central area of high density. Both classes of exposures therefore in the known process of exposure control frequently undergo unidirectional density corrections, even though they should be treated in the exactly opposite manner ("plus correction," i.e. higher density in the case of flash exposures, "minus corrections" in the case of the aforementioned counter light exposures). An improved recognition of sky areas would have a positive effect relative to colors also, for example in beach exposures, which often are copied with too much yellow, if measuring points of these areas flow into the correction.

Fundamentally the same problems as with sky exposures are encountered in snow images. Here again, improved density corrections would be desirable.

Amateur exposures take place frequently under less than ideal illumination conditions. This is particularly true for internal exposures under incandescent light. Most processes for exposure control comprise special measures for the correction of artificial light (see for example the operating instructions for the GRETAG high capacity printers 3139...3141), without which the aforementioned class of images would be copied with a pronounced yellow color cast. However, these measures often have a negative effect on images not created under incandescent light but hardly distinguishable relative to color from them. A typical example of cases leading to such miscorrections are outside exposures of leaves in the fall, corn fields, etc.

The second important class of artificial light exposures are the so-called neon light exposures. These again are predominantly inside exposures which in most cases are copied in view of the less than ideal illumination with a pronounced greenish color cast. The correction of artificial light in this case raises the same problems as that of incandescent light. The difficultly here in that purely by color criteria it is not possible to differentiate between neon and outside exposures with green vegetation with the desired accuracy.

The problem to be solved relative to color and density correction with photographic printers may be interpreted generally as follows: initially, the parts of importance for the image of an original must be identified and subsequently the quantities of copy light must be dimensioned so that the important parts are reproduced correctly on the copy material in relation to color and density.

Thus, for example, a process is described in U.S. Pat. No. 4,668,082, and DE 35 43 076 whereby the parts important for the picture are identified by an operator, but the determination itself of the illumination parameters is carried out by a computer on the basis of the measured transmission values of the original, with consideration of the information provided by the operator. Obviously, such a process cannot be used with high capacity printers.

The present invention is intended to eliminate these difficulties and create conditions whereby the aforedescribed classic problems may be handled better.

SUMMARY OF THE INVENTION

The exposure control process and the corresponding copying apparatus of the invention which satisfy this object are described in the independent claims. Preferred examples of embodiments and further developments are set forth in the dependent claims.

It is known that conventional color scanners measure the original in sections relative to three colors; they thus yield a triplet value per section. The exposure parameters are then calculated on the basis of the measured triplet value determined over one or several successive originals. According to the fundamental concept of the invention, these triplet values, which contain pure color information concerning the corresponding section of the original, are expanded by means of additional parameters containing further information relative to the detail contrast of the original in the section concerned. By virtue of this supplemental information significant improvements may be achieved in color and density corrections.

One of the principal reasons why even the aforementioned exposure control processes operating with high resolution scanners often fail at least partially is the lack of information concerning the fine structure of the original. The inclusion of detail contrast according to the invention, on the other hand, provides an appreciable improvement in many of the so-called classic problem cases. Thus, for example, a significantly improved recognition of areas of the sky and a better distinction between flash exposures and certain counter light exposures is achieved. In the case of snow pictures the inclusion of detail contrasts is again of advantage. Miscorrections in artificial light exposures may also be substantially reduced, if in addition to the usual criteria, information concerning detail contrasts is also included: inside pictures often have low contrast areas (for example a wall in the background), while the picture for example of an autumnal forest is characterized generally by a pronounced detail contrast in the blue density. The process may also be used advantageously in neon light exposures.

The analysis of the detail contrast according to the invention is useful in particular in the aforementioned identification of areas of the original of importance for the image. This may be based on the fact that parts of an original important for the image of an original (a face for example in a flash exposure) generally have a clearly higher detail contrast than parts of less importance (in a flash exposure, for example, a wall in the background; in an outside picture, for example, the sky).

Knowledge of detail contrasts may further be useful in relation to the recognition of originals not suitable for copying, as is already carried out in certain advanced printers (for example: GRETAG Printer 3139 ... 3143), based on the empirical fact that originals with a low detail contrast throughout only seldom have interesting image contents.

BRIEF DESCRIPTION OF THE DRAWINGS

Other objects and advantages of the present invention will become more apparent from the following detailed description of the preferred embodiments as described in conjunction with the accompanying drawings in which.

DETAILED DESCRIPTION OF THE INVENTION

The color copying apparatus according to the invention—with the exception of differences in the measuring layout for the copy originals and in the processing of measured values for the exposure control—may be constructed in a manner similar to conventional devices of this type, for example the high capacity apparatuses Model Nos. 3139, 3140, 3141 or 3142 of the present applicant, which are in worldwide use, and which are described in detail for example in U.S. Pat. Nos. 4,092,067, 4,101,216 and 4,279,505. These references and the operating instructions of the aforecited high capacity printers are hereby declared to be an integral part of the present description and are hereby incorporated in their entirety by reference.

Figure 6:
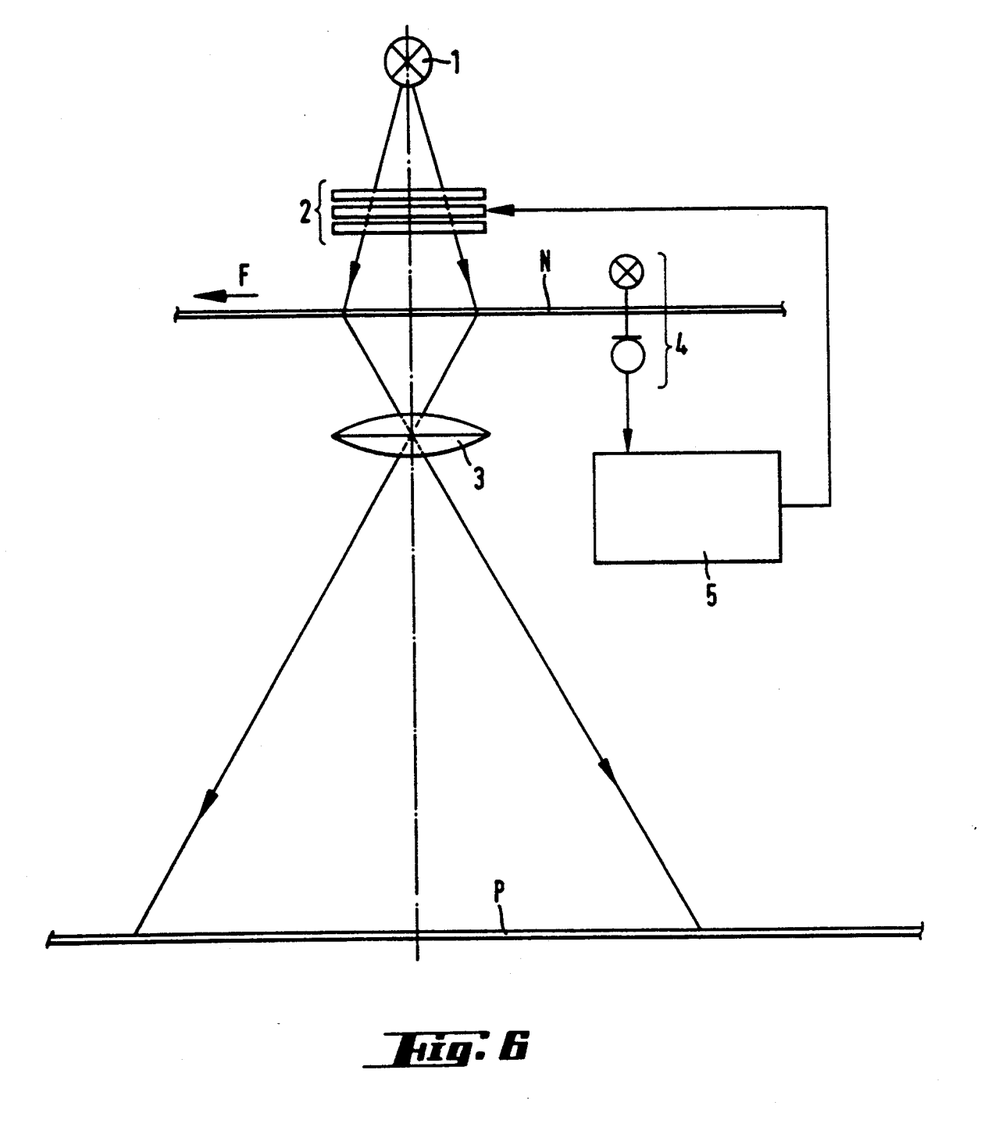
FIG. 6 shows a fundamental diagram of a color copying apparatus according to the invention.

FIG. 6 shows schematically the most essential components of such a color copying apparatus, necessary for an understanding of such an apparatus. It comprises a copying light source 1, a set of servo-controlled color shutters 2, optical imaging means 3, a photoelectric measuring layout 4 symbolically indicated by a source of measuring light and a photoreceiver, and an electronic exposure control device 5. The copy original N exposed to light coming from the copying light source 1 is imaged by the optical means 3 on a photosensitive copy material P, wherein the quantities of copying light for the individual partial exposures are determined on the basis of a preceding photoelectric measurement by regions and measured value analysis of the copy original by the exposure control device 5 and regulated by means of the color shutters 2.

As mentioned above, based on the photoelectric scanning of the copy original for each scanning region ( the copy original may be divided for example into about 1000–2000 such scanning regions) a measured triplet value representing the three color transmissions or color densities and at least one detail contrast parameter describing the contrast within the scanning region or forming a measure of said contrast, are determined. The entirety of these values belonging to one scanning region, i.e. the measured triplet value and the detail contrast parameter or parameters are designated hereafter as the measured tuplet value.

Figure 1:
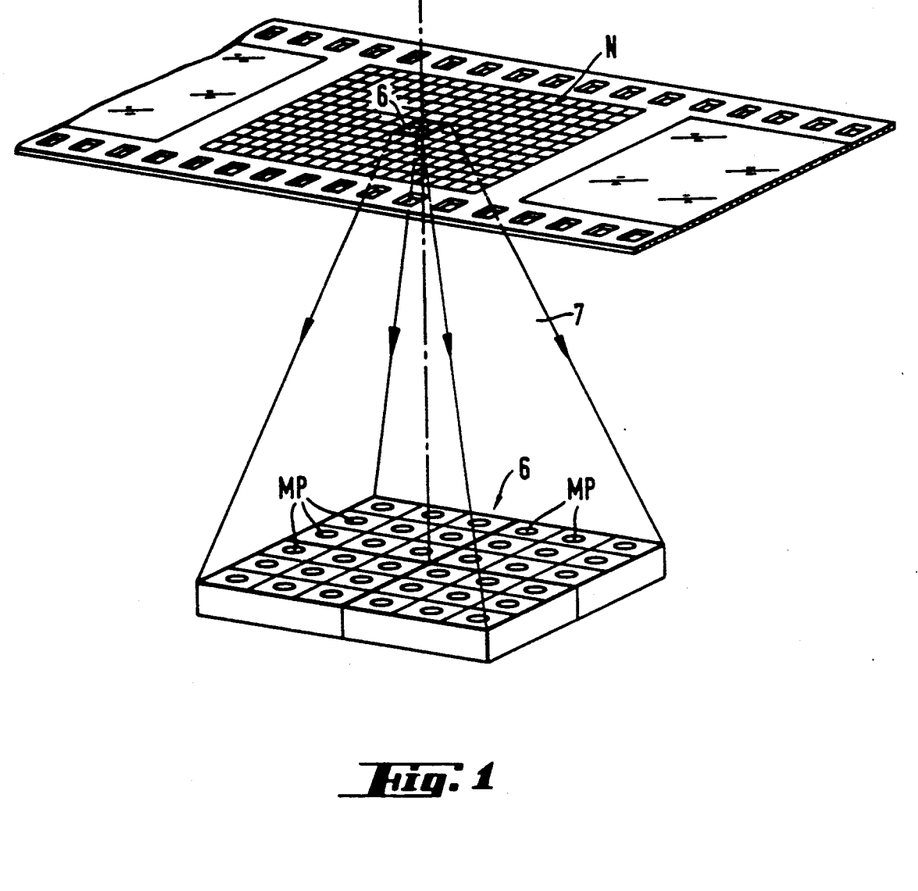
FIG. 1 shows a diagram to visualize the high resolution scanning of the original.

A possible process for the acquisition of such an extended tuplet value consists according to FIG. 1 of measuring the copy originals with a local resolution higher than that corresponding to the number of scanning regions (point-by-point scanning) and reducing this high resolution by the summation (averaging) of locally adjacent triplet values of the original to the extent (combining scanning points into scanning regions) that the computation of exposure parameters may be carried out (in view of the reduced data volume) at a justifiable cost (relative to computer time and computer capacity required), wherein the detail contrast parameters are determined from the high resolution triplet values.

Possible parameters describing the detail contrast $K_i$ are, for example, the difference determined in the three colors between the maximum and minimal density of the measuring points to be summarized:

$$K_i = \text{Max}(D_{ij}) - \text{Min}(D_{ij}) \qquad (I)$$
$$j = 1 \ldots N \quad j = 1 \ldots N$$

i = blue, green, red
N = number of measuring points to be combined
$D_{ij}$ = density of the color i in the measuring point j So as not to have to store and subsequently examine the entirety of the finely resolved measured triplet by means of a computer for detail contrasts and then convert it for a lesser resolution, adjacent measuring points are summarized and the detail contrast parameters $K_i$ advantageously determined simultaneously with the measuring process, i.e. while the scanner data are being acquired, so that immediately following the scanning of the entire original the totality of the measured triplets required for color and density corrections is also available. That this is possible with simple means, follows from the description hereafter of a preferred embodiment.

In a simpler variant of the process, in place of three detail contrast parameters $K_i$ a single parameter may be used, which may be determined for example by one of the following formulas:

$$K = \sum_i g_i \cdot K_i \quad \text{(II)}$$

or $$K = \text{Max}(K_i) \quad (i = \text{red, blue, green}) \quad \text{(III)}$$

or $$K = \underset{j=1\ldots N}{\text{Max}} \left( \sum_i f_i \cdot D_{ij} \right) - \underset{j=1\ldots N}{\text{Min}} \left( \sum_i f_i \cdot D_{ij} \right) \quad \text{(IV)}$$

(wherein b=blue, g=green, r=red). The factors $g_i$ and $f_i$ are positive weighting factors, which add up to 1, $K_i$ are the detail contrast values determined by Formula (I).

In addition, as a measure of the color detail contrast (optionally in combination with (IV), which with the proper selection of the $f_i$ coefficients may be considered a measure of the neutral density contrast) for example the following value may be used:

$$K = \underset{j=1\ldots N}{\text{Max}} (|D_{b,j} - D_{g,j}| + |D_{r,j} - D_{g,j}|) \quad \text{(V)}$$

in which N is the number of measuring points per scanning region and $D_{b,j}$, $D_{g,j}$ and $D_{r,j}$ signify the densities of the measuring point j in the colors of blue or green or red.

Figure 2:
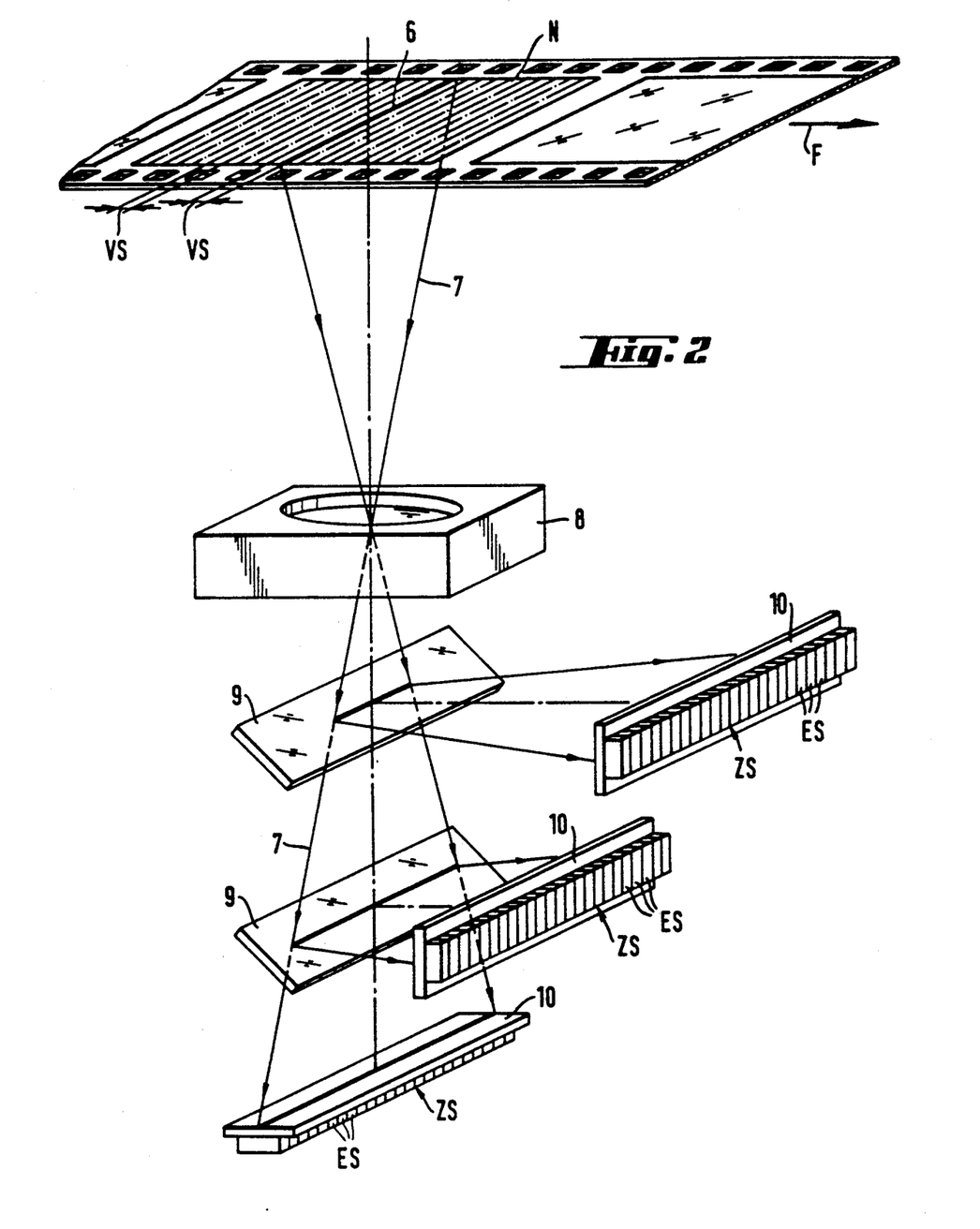
FIG. 2 shows a practical example of an embodiment of a suitable high resolution scanning apparatus.

FIG. 2 shows a possible layout known in itself for the high resolution scanning of a film original schematically. The original is being advanced by means not shown, step wise in the direction of the arrow, whereby always a strip-shaped region is exposed to the measuring light and imaged by means of an optical device and a color splitting prism onto three line sensors (linear sensor arrays) in a coincident manner. By means of the color splitter and the color filters preceding the line sensors it is obtained that each of the line sensors in its spectral range (blue, green, red) reacts with a suitable spectral sensitivity to the incident light. In this layout the local resolution transversely to the direction of advance is determined by the number of individual sensors of the three line sensors or linear sensor arrays (for example 128 or 256 individual sensors), the resolution in the advance direction by the magnitude of the advance step by which the original is moved and respectively by the geometry of the line sensors in the case of large forward steps. Integrating line sensors are used preferably, which measure and integrate in the course of the advance.

Figure 3:
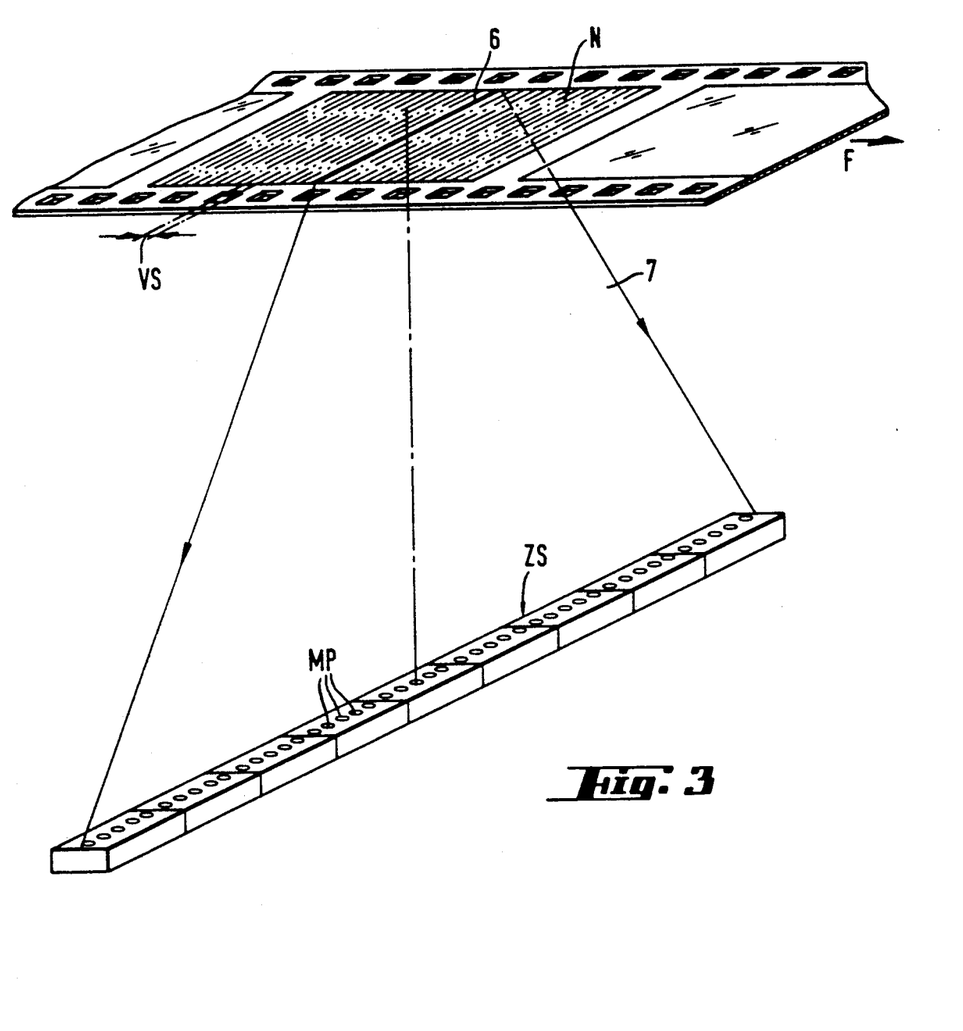
FIG. 3 shows a diagram similar to FIG. 1 to explain the mode of operation of the scanning apparatus according to FIG. 2.

In order to keep the measuring time for a given original low, in this case the magnitude of the advance step is chosen so that the exact coarser resolution described for the further processing of the data is obtained (for example 36 lines per image). In this selection of strongly differing resolutions in both directions, in the combination of measured values and the determination of the detail contrast, only points contained in the same line of the original are used (FIG. 3). A certain disadvantage of this specific solution is obviously that the detail contrast is detected in one direction only. An edge of the image extending transversely to the direction of advance for example cannot be detected. However, in the case of a high capacity printer, this disadvantage is compensated for by the shorter measuring time.

Figure 4:
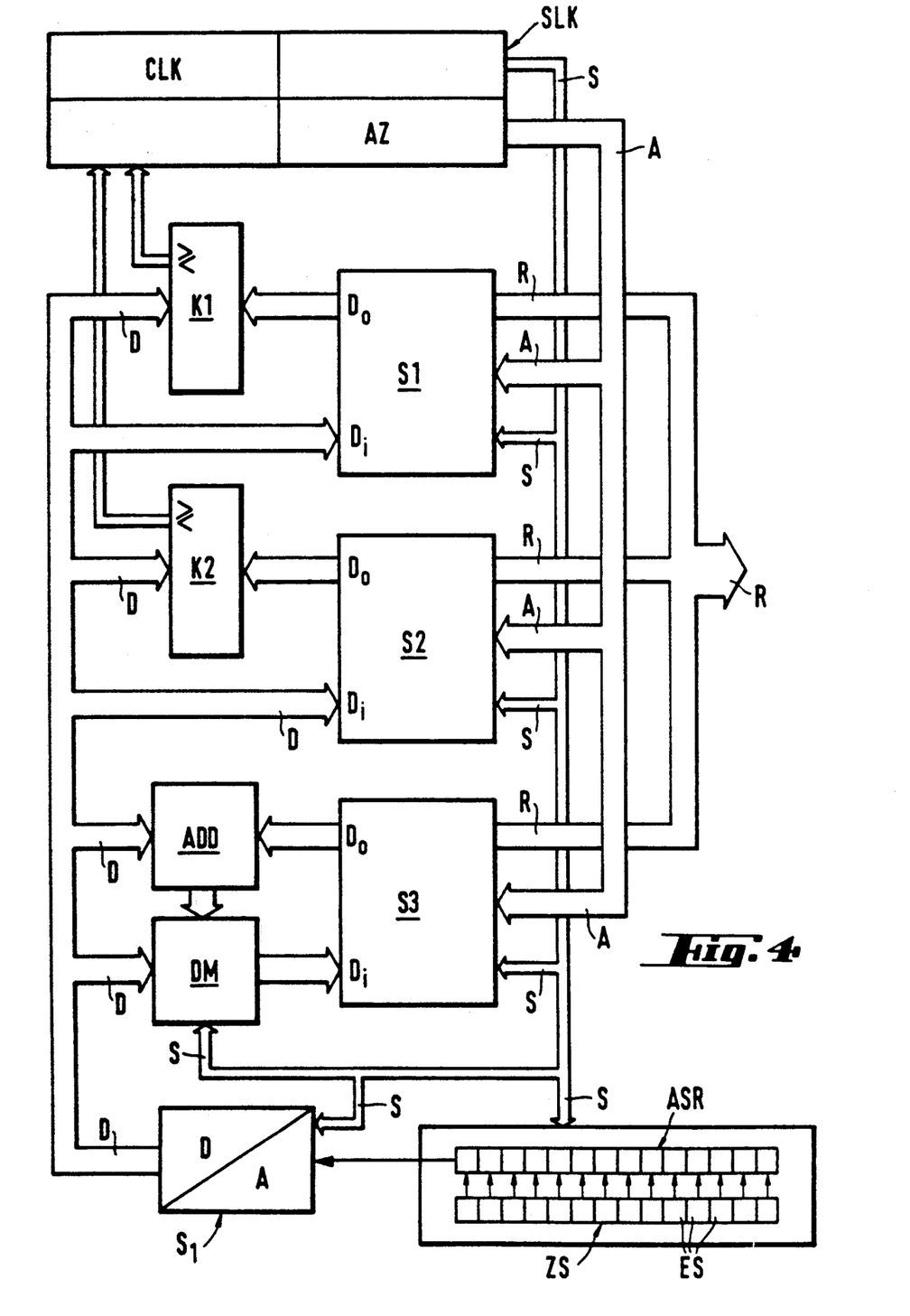
FIG. 4 shows a block diagram of an electric circuit for the processing of measured values.

FIG. 4 shows a block diagram of a circuit whereby the combination of the measured values and the determination of the parameters characterizing the detail contrast according to Formula (I) are carried out simultaneously with the reading out process of line sensors (one such circuit is used for each of the three color channels).

The measuring signals coming from one line of the original are present in the CCD line sensor initially in the form of individual charge packs, with each individual sensor supplying a charge essentially proportional to the light intensity received by the sensor and the time (measuring interval, integration time), during which the sensor is exposed to said intensity. These charge packs are transferred at the termination of the measuring interval simultaneously to an analog shift register ASR and from there passed serially to the outlet of a sensor line. In the subsequent first circuit block S1 the said charge packs are converted in a known manner into voltage signals, amplified, amplified, corrected relative to the dark signal, logarithmized, standardized and converted from analog to digital form. At the outlet of the first block digital values appear at the rate of the selection control signal, said digital values (for example with a resolution of 10 bits) representing the optical color density of the original in the regions covered by the individual sensors of the row.

These digital values are passed on by way of a data bus to two comparators (K1 and K2 and an adding device ADD. This bus further leads to the inlets of three random access memories (RAM) S1, S2 and S3, wherein the inlets $D_i$ of the third RAM may be switched selectively by means of a multiplexer DM to the outlets of the adding device ADD. The outlets of the first two RAM's S1 and S2 lead to one of the two comparators and that of the third one to the adding device ADD. The three Ram's are additionally connected with a common address bus A. The entire process is coordinated by a control logic SLK and regulated by a clock generator CLK. The following operation takes place in this circuit:

At the onset of the measuring of a line of the original the control logic is initialized, in particular the address counter AZ contained in it is set to zero. As soon as the first measured value D of a group to be combined appears at the outlet of the first circuit block, it is read directly into the three RAM's, into the memory cells being addressed by the address bus A.

While the further measured values D of the same group are being acquired, the address bus A remains unchanged. At the outlet of the three RAM's therefore, the last value read in is always present.

This value is compared in the case of the first RAM S1 in the first comparator K1 with the most recent measured value. If the new measured value is higher than the stored value, the control bus S causes the old content of the memory cell of the first RAM being addressed to be overwritten. Otherwise, the original value is retained.

In the case of the second RAM S2 the same process is repeated with the difference that the old value is overwritten if it is larger than the new value (the comparison takes place in the second comparator K2). The outlet of the third RAM S3 is added in the adding device ADD to the new measured value. The resulting sum then replaces the previous value of the memory cell addressed by the address bus of this RAM.

Following the acquisition of all of the measuring points of this group, the first RAM S1 contains the maximum density value of the group, the second RAM S2 the minimum and the third RAM S3 the sum of the density values of the group (this sum, divided by the number of measuring points of the group, yields the average density of the group in the color of the channel, to which the circuit is assigned).

Subsequently, in the control logic SLK the address counter AZ is incremented by one and the process beings anew (at step 2), wherein the values obtained are deposited in keeping with the incremented address in a new set of memory cells.

When all of the numbers of measuring points of the measuring line are processed, the original is moved into the next measuring position. In the meantime the minimum, maximum and summed density values of the individual groups of measuring points are read out for further processing through the output bus R of the circuit (for this, the address counter in the control logic is initially set to zero and subsequently incremented in individual steps to the N−1 (N=number of groups per line)).

The read out and evaluation of the measuring points of the next measuring line may now begin. The entire process thus again beings with step 1.

It should also be mentioned that addition (averaging) of the measuring signals of several sensors leads to improved signal-to-noise ratios, as in the process the interference signals of the individual signals partially cancel each other out, while the useful signals add up (M. Schwartz/Papoulis). A further possibility of improving the signal-to-noise ratio may be obtained in the case of a CCD measuring line because either the intensity of the measuring light or the integrating time of the sensor of the average density is adapted to the original, so that the sensor is always operated in the vicinity of a favorable working point (Fairchile Weston/Schlumberger: 1987 CCD Databook).

The aforedescribed examplary embodiment is based on a (CCD)-line sensor as the image detector. It is, however, obvious that the embodiment of the principle is largely independent of the process used in the scanning of the original.

Thus, in place of a line sensor an area sensor may also be used, whereby the image points are simultaneously measured and read out sequentially. The sequential read out may be affected for example line-by-line or, by means of a special read out structure so that the measured values to be summarized upon the transition to a lower resolution follow each other in time and appear at the outlet of the area sensor.

Obviously, the principle according to the invention may also be applied in the case of a "flying spot" scanner with "point sensors" (EP 0 103 583, WO 83/02896, GB 1 369 864).

The exemplary embodiment described above uses three separate sensors for the measurement of the original in three colors. It is obviously also possible to use one sensor only, which measures the original sequentially in three colors, or to employ an area sensor, the elements of which have different spectral sensitivities and are laid out in a manner such that a common region of the original is always detected by at least three locally adjacent sensor elements, simultaneously in the blue, green and red wavelength ranges (DE 36 04 964, U.S. Pat. No. 4,709,259, DE 36 15 342).

The exemplary embodiment described above employs a special digital circuitry for the summation of measured values and to determine the detail contrast. Obviously, the necessary operations could also be carried out by means of a microcomputer or signal processor (which could also perform the further processing of the data). Such a solution would have the further advantage of a greater flexibility relative to the number of measured values to be summed, choice of weights for the detail contrast (Formula I . . . V), etc.

In the aforedescribed exemplary embodiment, the measured values are processed in the logarithmized form, i.e. as density values. It is also possible to carry out the further processing entirely or in part, with intensity or transmission values in place of density values. The characterization of the detail contrast may again be effected by means of the Formulas (I) to (V), by setting the corresponding transmission or intensity values in place of the density values. The principle of the present invention can also be realized in a configuration suitable specifically for (high capacity) printers already equipped with a color scanner of a lower or intermediate resolution. In such a case it may be advantageous to use the existing sensor further for the determination of three color values (triplet value) of a measuring triplet, but to obtain the detail contrast information supplementing the triplet by means of an additional high resolution measuring system. To keep the expense of the additional measuring system down, a restriction to a neutral density measurement undifferentiated relative to color is possible; it provides detail contrast values essentially corresponding to those determined by Formula (IV). The parameters describing the detail contrast may be determined in principle by the circuit described in the above exemplary embodiment. Simplification is possible to the extent that the combination of locally adjacent measured points is not necessary, as the color scanner operating with a lower resolution generally (because of the size of its scanning spot) yields values averaged over a wider area of the original.

If two separate measuring systems are used, there naturally arises the problem of the exact coordination of the measured values of the high resolution system with those of the system with the lower resolution, as it must be assured that each of the color tuplets (usually triplet values) provided corresponding to a certain region of the original is being supplemented by the detail contrast value from the same region of the original. However, such a coordination may generally be realized in a simple manner, particularly in the case where both measuring systems use a line sensor which scans the original (as explained above) simultaneously over its entire height. As the relative geometric layout of both systems is known and the second dimension of the local scan is given for both systems by the advance of the original, it is sufficient to monitor this advance by technical measuring means, thereby synchronizing the measuring process in both of the systems.

An extension of the measuring system of a photoprinter with a high resolution sensor, such as known from DE 26 52 287, DE 26 54 943, DE 34 08 765, can also be used for the detection of extremely unsharp originals. In contrast to the process proposed herein, these known methods utilize the possibilities of high resolution measuring to a limited extent only; in particular, the high resolution measured values are not used to improve color and density corrections proposed by the invention.

The fact that the availability of information concerning the fine structure of the original may be used in multiple manners to improve color and density corrections, has been described in detail in the foregoing. Generally speaking, this additional information creates the possibility of a more refined analysis of the original.

The following examples are primarily intended to show how this supplemental detail contrast information may be built into the known algorithms for the determination of exposure values (quantities of copying light) in photoprinters, in a simple and natural manner. The procedure is based on the processes for color and density corrections described in U.S. Pat. No. 4,092,067 and EP 4279505, and in the operating manuals of the GRETAG high capacity printers 3139 . . . 3142.

In these processes the determination of the exposure parameters is carried out separately for color and density (wherein, however, the density correction is also based on color criteria and the color correction on density criteria).

In U.S. Pat. No. 4,092,067 and U.S. Pat. No. 4,279,505 a density correction process is described, wherein among others, the original is divided into concentric zones, certain intermediate values being determined for these zones from each of the zones from the neutral density values (calculated as in (IV) by linear combination from the three color density values) and subsequently the final values governing the determination of the overall exposure being determined from the intermediate values (designated in U.S. Pat. No. 4,279,505 as the "Basic Density Correction Values BDC"). In the determination of the final values, the intermediate values of the different zones enter with different weightings. The highest weight is assigned to the center zone in view of the fact that the most important part of an original relative to the image is found most often in the center.

As mentioned above, however, the presence of a relatively high detail contrast is an indication that the zone of the original being viewed may be a part important for the image. In place of or complementary to a group of measured values by local criteria (zone division), therefore a grouping of the (expanded) measuring tuplets based on the detail contrast is conceivable. In the simplest case the process expanded in this manner may be carried out as follows (it is assumed that the detail contrast of each tuplet is characterized by a scaler quantity, determined for example by Formula (IV)):

Initially, as described in U.S. Pat. No. 4,279,505, a first final value E1, weighted on the basis of the zone division, is determined. In a second step the maximum detail contrast value Kmax and the minimum detail contrast value Kmin are determined over the entirety of the measuring tuplets. From these two values a threshold value Ks is subsequently calculated, for example a mean value of Kmax and Kmin. The entirety of the tuplets is then divided into two groups, with the first group being assigned the measuring tuplets for which K<Ks and the second group the remaining tuplets. Similarly to the process according to U.S. Pat. No. 4,279,505, intermediate values are now determined for each of the two groups and from this, by differential weighting of the intermediate values of the two groups, a second final value E2 is determined. The weight of the first group is chosen to be smaller than that of the second one. (The place of the local is therefore taken by the detail contrast groups). In a third step, the new final value E, which is decisive for the determination of the total exposure, is determined as the linear combination of E1 and E2:

$$E = a \cdot E_1 + b \cdot E_2$$

wherein $0 \leq a, b \leq 1$ and $a + b = 1$.

U.S. Pat. No. 4,279,505 describes a refinement of the density correction method which, graphically expressed, has the purpose of isolating certain portions that represent a sky or a snowy part with great probability, and to insure that they enter the final value E governing the total exposure with a reduced weighting. The following criteria are used to detect such zones:

The neutral density of all of the measuring points of the zone must exceed a certain threshold value.

The zone must be continuous and must extend to one of the edges of the original.

As both sky and snow portions generally have low detail contrasts, their detection may be improved according to the invention, by introducing the following as an additional criterion:

The detail contrast of all of the tuplets of the zone must be lower than a certain threshold value Ks (determined for example as described above).

Figure 5:
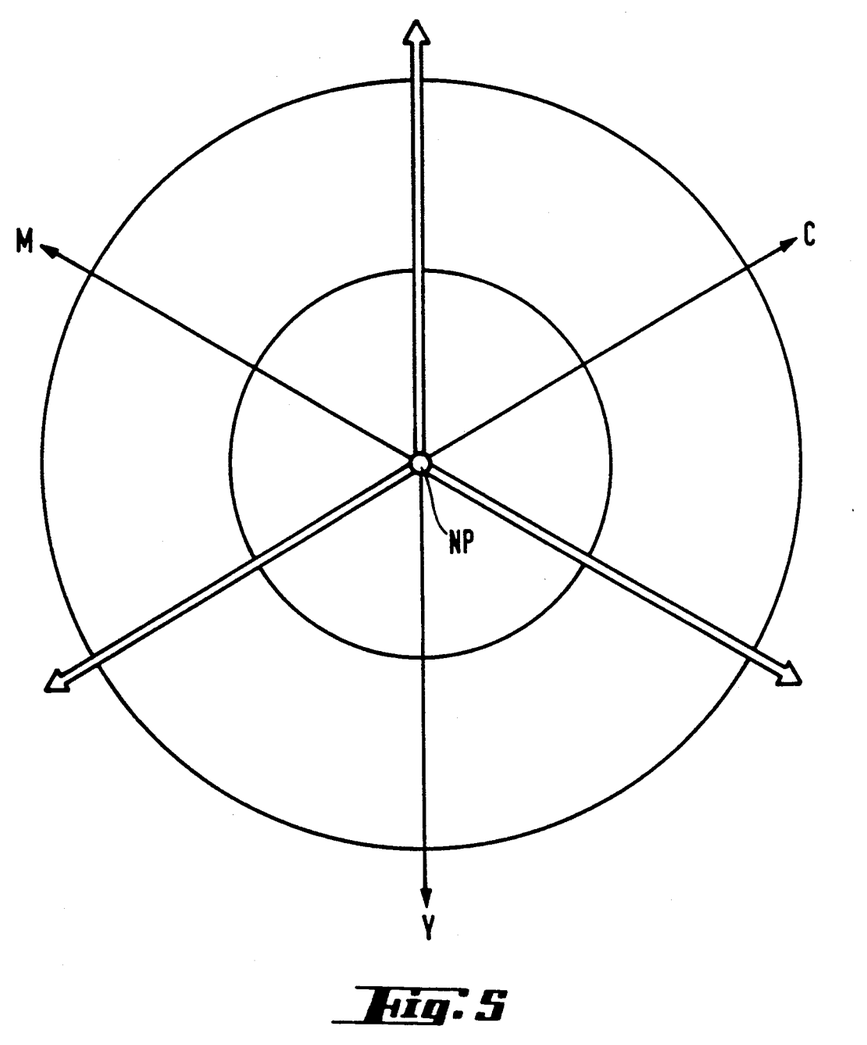
FIG. 5 shows a diagram to explain the exposure control process of the invention.

The color correction process described in the operating instruction for the GRETAG printers 3139 . . . 3142, is based on the representation of the three-dimensional measured values (color densities) in a two-dimensional color plane (FIG. 5). As the reference point for the determination of the "coloration" of a measuring point a so-called "neutral point" is used, which essentially corresponds to a normally exposed image of a scene neutral relative to color.

Roughly speaking, the fundamental principle of the process consists of each measured value contributing to the total correction based on its color deviations from the neutral point, i.e. with a relative weight Go as a function of the position o the point in the color plane. This weight decreases with increasing color saturations of the measuring point (i.e. with a rising distance from the neutral point) and becomes zero from a variable threshold (no dominant colors can thus have an effect on the correction of color).

The process may be improved in a simple manner by the inclusion of the detail contrast information by determining the weight G for the correction amount of each tuplet not only by its position in the color plane, but simultaneously also by its detail contrast K, determined for example by Formula (V), for example by the formulas:

$$G = Go \cdot (Kmax - K)/(Kmax - Kmin)$$

or $$G = 0.5 \cdot Go \cdot \left[ 1 + \frac{K_{max} - K}{K_{max} - K_{min}} \right]$$

wherein Go ($0 \leq Go \leq 1$) is the weight determined by the position of the measured tuplet in the color plane only and $K_{max}$ and $K_{min}$ represent the maximum and minimum detail contrast value determined over the entirety of the tuplets.

Briefly expressed, tuplets with a high detail contrast enter the calculation of the color correction and thus of the exposure parameters with a reduced weight. This has a positive effect for the following reasons:

In particular, with images that are strongly structured relative to color and with a low or intermediate scanner resolution the problem arises that the zone of the original over which a measured value is formed, frequently includes two areas with different colorings. Thus, for example at the boundary between an intensively colored surface ("color dominant") and a neutral surface of the original, values with a relatively low color saturation are obtained, which therefore enter the correction in case of a weighting based exclusively on their position in the color plane with a weight that is too high, thereby leading to an error in color.

With the process improved according to the invention, this problem occurs in a strongly reduced degree only, as such boundary areas are characterized by a high detail contrast and thus enter the calculation with a lower weight G.

Neon light and outside exposures with green vegetation are both characterized by measured values with a green density higher than average. In conventional color correction processes the problem arises that even in the case of the optimum setting of the correction parameters neon light exposures are often corrected weakly and therefore possess a pronounced green color cast, while on the other hand the aforementioned outside exposure undergo an excessive correction and therefore are copied with magenta color cast that is disturbing for the viewer. Any amplification of the color correction for images with an increased green density takes place inevitably at the expense of outside exposures with green vegetation (while improving the correction of neon light exposures), while conversely a weakening of the correction would take place unavoidably at the expense of the neon light exposures.

The process improved according to the invention solves this problem to a high degree automatically, as the measuring tuplets with higher green densities in outside exposures generally are characterized by a high detail contrast ("filigran contrast"), and therefore act on the color correction in a weakened form only, in contrast to the inside neon exposures, in which tuplets with high green densities often occur with a low detail contrast, therefore entering the correction with relatively high weight.

A similar problem is encountered in conventional color correction processes concerning the distinction between inside exposures effected under incandescent light, and outside exposures which hardly differ in their colors, such as the aforementioned autumn exposures. Here again, the process according to the invention provides an improvement, again based on the fact that the two categories generally differ by their filigran contrast, which desirably leads on the average to a stronger correction of the incandescent light exposures.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Process for the control of exposure in a photographic color copying apparatus comprising the steps of:
   scanning a copy original in a plurality of scanning regions photoelectrically;
   determining a measured triplet value for each scanning region from scan values obtained, corresponding to three color transparencies or color densities of the scanning region of the copy original
   determining for each scanning region at least one detail contrast parameter representing a measure of the detail contrast within the scanning region;
   and determining the necessary quantities of copying light from said triplet values and from taking said detail contrast parameters.

2. Process according to claim 1, wherein each scanning region is scanned in a plurality of measuring points and the detail contrast parameters are determined from the scan values of said measuring points.

3. Process according to claim 2, wherein as the measure of the detail contrast, three detail color contrast parameters ($K_i$) are determined per scanning region, by the formula:

$$K_i = \mathop{\text{Max}(D_{ij})}_{j=1\ldots N} - \mathop{\text{Min}(D_{ij})}_{j=1\ldots N}$$

wherein i signifies the three colors red, blue and green, N the number of measuring points in a scanning region, and $D_{ij}$ is the density of the j-th measuring point in the color i, and said three detail color contrast parameters are taken into consideration in the determination of the quantities of copy light.

4. Process according to claim 3, wherein as the measure of the detail contrast a combined detail contrast parameter (K) is derived from the three detail color contrast parameters ($K_i$) by the formula:

$$K = \sum_i g_i \cdot K_i$$

and is included in place of the three detail color contrast parameters in the determination of the quantities of copying light, wherein i signifies the three colors red, blue and green and $g_i$ stands for three positive weighting factors adding up to 1.

5. Process according to claim 3, wherein as a measure of the detail contrast, a combined detail color contrast parameter (K) is determined from the three detail color contrast parameters ($K_i$) by the formula:

$$K = \text{Max}(K_i)$$

and is included in place of the detail color contrast parameters in the determination of the quantities of copying light.

6. Process according to claim 2, wherein the detail contrast parameters are determined by the formula $$K = \mathop{\text{Max}}_{j=1\ldots N}\left(\sum_i f_i \cdot D_{ij}\right) - \mathop{\text{Min}}_{j=1\ldots N}(\Sigma f_i \cdot D_{ij})$$

wherein i signifies the three colors red, blue and green, N the number of measuring points per scanning region, $D_{ij}$ is the density of the measuring point j in the color i and $f_i$ signifies three positive weighting factors adding up to 1.

7. Process according to claim 2, wherein that the detail contrast parameter is determined by the formula:

$$K = \max_{j = 1 \ldots N} (|D_{b,j} - D_{g,j}| + |D_{r,j} - D_{g,j}|)$$

wherein N is the number of measuring points per scanning region and $D_{b,j}$, $D_{g,j}$, and $D_{r,j}$ are the densities of the measuring point j in the colors blue, green or red.

8. Process according to claim 2, wherein the copy original is scanned point-by-point with a high resolution and the scan values of the scanning regions are determined by combining the scan values of the scanning points of a scanning region.

9. Process according to claim 2, wherein the scanning of the copy original is effected with a higher resolution in an advance direction than in a direction transverse to the advance direction, wherein each scanning region preferably contains a single row of measuring points.

10. Process according to claim 8, wherein the scanning of the copy original is effected with a higher resolution in an advance direction than in a direction transverse to the advance direction, wherein each scanning region preferably contains a single row of measuring points.

11. Process according to claim 1, wherein to detect sky or snowy areas, detail contrast parameters of the scanning regions are compared with a detail contrast threshold value, and a portion of the original is defined as a sky area and correspondingly taken into consideration in the determination of the quantities of copying light if all of the detail contrast parameters of the scanning region belonging to said portion of the original are below said detail contrast threshold.

12. Process according to claim 3, wherein to detect sky or snowy areas, detail contrast parameters of the scanning regions are compared with a detail contrast threshold value, and a portion of the original is defined as a sky area and correspondingly taken into consideration in the determination of the quantities of copying light if all of the detail contrast parameters of the scanning region belonging to said portion of the original are below said detail contrast threshold.

13. Process according to claim 11, wherein the detail contrast threshold is chosen as the mean value between the largest and the smallest detail contrast parameter found in the original.

14. Process according to claim 12, wherein the detail contrast threshold is chosen as the mean value between the largest and the smallest detail contrast parameter found in the original.

15. Process according to claim 1, wherein scanning regions with a first detail contrast are considered to a greater extent in the calculation of density corrections than scanning regions with a second detail contrast wherein said second detail contrast is lower than said first detail contrast.

16. Process according to claim 3, wherein scanning regions with a first detail contrast are considered to a greater extent in the calculation of density corrections than scanning regions with a second detail contrast wherein said second detail contrast is lower than said first detail contrast.

17. Process according to claim 1, wherein scanning regions with a first detail contrast are considered to a lesser extent in the calculation of color corrections and thus of the quantities of copying light, than scanning regions with a second detail contrast wherein said second detail contrast is lower than said first detail contrast.

18. Process according to claim 3, wherein scanning regions with a first detail contrast are considered to a lesser extent in the calculation of color corrections and thus of the quantities of copying light, than scanning regions with a second detail contrast wherein said second detail contrast is lower than said first detail contrast.

19. Color copying apparatus with a projection layout for the imaging of a copy original on a photosensitive copy material, comprising:
a scanning layout for the photoelectric scanning by regions of the copy original in a plurality of scanning regions; electronic exposure controls which determine quantities of copying light required from scanning values produced by the scanning layout; means for determining detail contrast parameters forming a measure for the detail contrast within each individual scanning region, said exposure controls using said detail contrast parameters in the determination of the quantities of copying light.

20. Copying apparatus according to claim 19, wherein the means for determining the detail contrast parameters further comprise a high resolution scanning system, which scans the copy original point-by-point, a plurality of scanning points being located within each scanning region.

* * * * *